Nov. 15, 1966 T. J. DULSKI ET AL 3,285,699
POROSITY TEST METHOD
Filed May 7, 1964
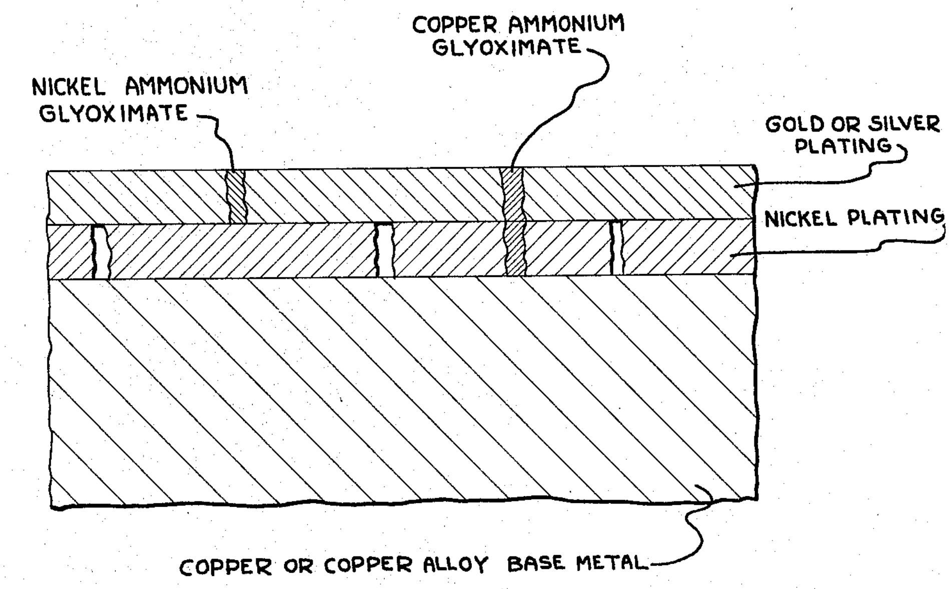

United States Patent Office 3,285,699
Patented Nov. 15, 1966

3,285,699
POROSITY TEST METHOD

Theodore Joseph Dulski, Hummelstown, and Kermit Winston Holler, Camp Hill, Pa., assignors to AMP Incorporated, Harrisburg, Pa.

Filed May 7, 1964, Ser. No. 365,644
4 Claims. (Cl. 23—230)

This invention relates to methods of testing electrodeposited platings for the presence of pores.

Electrical contact terminals of copper or copper alloy are frequently electroplated with nickel and with gold or silver over the nickel plating. Gold is a highly desirable final plating for such terminals because of its extremely high resistance to corrosion and its excellent conductivity. A nickel plating is provided between the gold and the copper base metal for the reason that the electrodeposited gold plating is very thin for economic reasons and may be somewhat porous. The purpose of the nickel underplating is to separate the gold plating from the copper base metal and prevent the formation of any copper corrosion product on the surface of the gold. Silver is sometimes used as a final plating instead of gold because of the lower price of silver although it is inferior to gold in some respects.

The efficacy of a gold or silver over nickel plating on copper or copper alloy contact terminals is seriously reduced if the plating contains pores extending through the gold or silver which are in alignment with pores extending through the nickel to the copper base metal. Although such pores are of an extremely small diameter, they nonetheless permit the formation of a corrosion product of the copper base metal on the surface of the gold or silver plating which detracts from the performance of the contact terminal. It is therefore important to be able to determine whether or not a given terminal contains any aligned pores extending through the gold plating and the nickel plating to the copper base metal. It is also important to determine if there are any pores extending through the gold or silver to the nickel underplating since such pores in the final plating permit the formation of nickel oxides on the surface of the contact.

A primary object of the invention is therefore to determine the presence or absence of aligned pores in the gold or silver over nickel plating on contact terminals. A further object is to determine the presence or absence of pores in a gold or silver plating.

In accordance with the invention, the surface of the specimen is first activated by contact with hydrochloric acid. Thereafter, the specimen is contacted with dimethylglyoxime vapor at an elevated temperature. If pores exist in the gold or silver plating which extend to the nickel plating, a reaction product comprising a nickel glyoximate salt will be formed in the pores and will extend to the surface of the gold or silver. If on the other hand, a pore extends through the gold or silver and is in alignment with a pore extending through the nickel to the copper base metal, a copper glyoximate salt will be formed in these aligned pores. After contacting with the dimethylglyoxime vapor, the specimen is contacted with ammonia fumes with the result that if copper or nickel glyoximates are present in the pores, these glyoximates will react with the ammonia fumes to form copper ammonia glyoximates and nickel ammonia glyoximates. These copper and nickel ammonia glyoximates have charactertistic colors and can be detected visually with the aid of a microscope to show the presence of pores in the specimen tested.

In the drawing:

The attached drawing is a schematic cross-sectional representation of a gold or silver over nickel plating on a copper base metal part illustrating the practice of the invention.

The method of the present invention is particularly intended to determine the presence or absence of pores in gold or silver over nickel platings on copper or copper alloy parts such as electrical contact terminals. The nickel plating on such parts will usually be in a range of about 20 to 100 millionths of an inch and the gold or silver plating is usually of about the same thickness.

In preferred practice and where the final plating is gold, the specimen being tested is first exposed to hydrochloric acid vapors at a temperature of about 220° F. This may be done by placing the specimen in a desiccator with a beaker containing concentrated hydrochloric acid and heating the desiccator in an oven for one-half hour to 220° F.

The specimen is then exposed to the presence of dimethylglyoxime at a temperature of about 360° F. for one hour. This step may be carried out by placing the specimen in a desiccator along with an evaporating dish containing dimethylglyoxime powder. The desiccator is sealed, placed in an oven and heated to the required temperature. After removing the desiccator from the oven, it is allowed to cool to approximately 200° F. and the evaporating dish containing the dimethylglyoxime is removed. A beaker containing concentrated ammonium hydroxide is then placed in the desiccator and the desiccator is sealed to permit the ammonia fumes to contact the surface of the specimen. After about one-half hour of this treatment, the specimen is removed and examined under magnification of about 60 diameters. The presence of a red spot on the surface of the specimen indicates that a pore is present beneath the spot and extends through the gold or silver plating to the nickel underplating. The presence of a black spot on the surface of the gold indicates that a pore extends through the gold or silver and nickel to the copper or copper alloy base metal. These red and black spots denote the presence of nickel ammonium glyoximates (red spots) or copper ammonium glyoximates (black spots). The red spots are formed by the reaction of nickel with dimethylglyoximate and the black spots are formed by the reaction of the copper base metal with the dimethylglyoximate.

The method of the present invention will reveal presence of extremely small pores in a plating. It has been determined for example, that pores having a diameter of 0.000005 inch will be revealed when the process steps outlined above are followed. The method of the present invention will also reveal the presence of larger pores and, as explained below, can be utilized to reveal the presence of areas from which the plating metal has been removed by wear as in disengageable electrical contacts.

Where the final plating is of silver rather than gold, the method is as described above except that somewhat more careful preparation of the surface is required. Particularly, in determining the presence or absence of pores in a copper or copper alloy part having a nickel plating and a silver plating over the nickel plating, the part is first contacted with concentrated hydrochloric acid. It is then washed with distilled water and dried thoroughly. The steps described above, beginning with the steps of contacting the part with hydrochloric acid vapor are then followed.

It is believed that the actual mechanism of the test depends upon the condensation of dimethylglyoxime in the pores when the specimen is permitted to cool while in an atmosphere containing dimethylglyoxime vapors. This condensation of the dimethylglyoxime causes the formation and growth of the copper glyoximate crystals and nickel glyoximate crystals in the pores. Since the plating is quite thin, these crystals will extend entirely through the pores to the surface of the gold and after conversion to copper ammonium glyoximate and nickel ammonium glyoximate will be visible on the surface of the gold. It is quite probable that where a black spot is observed (copper ammonium glyoximate) there may be some nickel ammonium glyoximate present also. If the nickel salt is intermixed with the copper salt in aligned pores, the black color of the copper ammonium glyoximate apparently predominates. It is believed that the heating of the desiccator in which the specimens are contacted with the dimethylglyoxime promotes the reaction between the copper or nickel and the dimethylglyoxime vapor in that the pressure within the desiccator is raised which as a result of heating and the vapor is forced into the pores which, as noted above, may be of an extremely small diameter.

This method of testing for porosity is particularly intended for extremely thin platings and has been used successfully where the thickness of the nickel platings is in the range of 10 to 100 millionths of an inch and the thickness of the gold or silver plating is in the range of 25 to 100 millionths of an inch.

The following specific example will illustrate the practice of this invention.

A group of electrical terminals having a gold over nickel plating thereon was placed in a desiccator along with a 25 ml. beaker containing approximately 10 ml. of concentrated hydrochloric acid. Several control specimens were also placed in the desiccator, the control specimens comprising copper terminals having a nickel plating on only a part of their surface with a part of each specimen being unplated. The desiccator was placed in an oven and heated until its temperature reached 200° F. which temperature level was maintained for one-half hour. Thereafter the desiccator was removed from the oven and opened. The beaker containing the concentrated hydrochloric acid was removed from the desiccator and an aluminum foil dish containing approximately 5 grams of dimethylglyoxime powder was placed in the desiccator. The desiccator was then resealed, placed in the oven and heated until its temperature reached 360° F. The desiccator was maintained in the oven for one hour and was then removed from the oven. When the desiccator had cooled to approximately 200° F., the cover was removed and the control specimens were examined. These samples were observed to have a uniform copper colored film on the nickel plated portion of their surfaces indicating that the dimethylglyoxime had reacted with the nickel. The unplated portions of the surfaces of the control specimens were covered with a uniformly black coating indicating that the dimethylglyoxime had reacted with the copper. The appearance of the control specimens thus indicated that any reaction between the specimens under test and the dimethylglyoxime had taken place. A 25 ml. beaker containing approximately 10 ml. of concentrated ammonium hydroxide was then placed in the desiccator and the desiccator was sealed. After one-half hour, the test specimens were removed from the desiccator and examined at a magnification of 60 diameters. Several discrete red spots were observed indicating the presence of pores extending through the gold to the nickel underplating. Several black spots were also noted which indicated the presence of pores extending through both the gold and the nickel plating to the copper.

While the invention has been described above as a test for porosity in gold on silver over nickel platings on copper parts, the test is equally usable for the determination of small wear points in such platings since the same reaction products will be formed and the same colors will be observed where the plating is worn through either to the nickel underplating or to the copper.

A salient advantage of the invention is that the test is selective as regards pores extending only through the gold or silver plating and pores extending through the gold or silver and through the nickel. A further advantage is that the present method provides a quantitative test in that the individual pores in the specimen are revealed so that the density of the pores on surface of the specimen can be determined.

Changes in construction will occur to those skilled in the art and various apparntly different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. The method of testing a plated article for plating imperfections, said article being of a metal selected from the group consisting of copper and copper alloys and being plated with a layer of nickel and a layer of metal selected from the group consisting of gold and silver over said layer of nickel, said method comprising the steps of contacting said article with dimethylglyoxime vapor and subsequently contacting said article with ammonia whereby copper and nickel glyoximates are formed in any imperfections in said gold plating, and said glyoximates are converted by said ammonia to copper and nickel ammonium glyoximates having a characteristic color.

2. The method of testing a plated article for imperfections, said article being of a metal selected from the group consisting of copper and copper alloys and being plated with a layer of nickel and a final plating of metal selected from the group consisting of gold and silver over said layer of nickel, said method comprising the steps of contacting the surface of said article with gaseous hydrochloric acid to activate said surface, subsequently contacting said surface with dimethylglyoxime vapor at an elevated temperature, cooling said article from said elevated temperature, and subsequently contacting said surface with ammonia whereby, copper and nickel glyoximates are formed in any imperfections in said plating and said glyoximates are converted by said ammonia to copper and nickel ammonium glyoximates having a characteristic color.

3. The method of testing a plated article for the presence of pores and wear, said article being of a metal selected from the group consisting of copper and copper alloys and being plated with a layer of nickel and a final plating of metal selected from the group consisting of gold and silver over said layer of nickel, said method comprising the steps of contacting said article with hydrochloric acid vapor, subsequently contacting said article with dimethylglyoxime vapor, and subsequently contacting said article with ammonia whereby copper glyoximate crystals are formed in aligned pores extending through said final plating and nickel platings and said copper glyoximate crystals are converted to copper ammonium glyoximate upon contact with said ammonia vapors, said copper glyoximate crystals having a characteristic black color, and nickel glyoximate crystals are formed in any pore extending through said final plating to said nickel plating and said nickel glyoximate crystals are converted to a nickel ammonium glyoximate by said ammonia, said nickel ammonium glyoximate having a characteristic red color.

4. The method of testing a plated article for the presence of pores and wear, said article being of a metal selected from the group consisting of copper and copper alloys and being plated with a layer of nickel and a final plating of metal selected from the group consisting of gold and silver over said layer of nickel, said method comprising the steps of contacting said article with a hydrochloric acid vapor, subsequently contacting said article with dimethylglyoxime vapor at an elevated temperature, cooling said article, and subsequently contacting said article with ammonia whereby copper glyoxímate crystals are formed in aligned pores extending through said final plating and nickel plating and said copper glyoximate crystals are converted to copper ammonium glyoximate upon contact with said ammonia vapors, said copper glyoximate crystals having a characteristic black color, and nickel glyoximate crystals are formed in any form extending through said final plating to said nickel plating and said nickel glyoximate crystals are converted to a nickel ammonium glyoximate by said ammonia, said nickel ammonium glyoximate having a characteristic red color.

References Cited by the Examiner

UNITED STATES PATENTS 1,753,301 4/1930 Pitschner ------------ 23—230

OTHER REFERENCES

Lowenheim: "Modern Electroplating," 2d. Ed., Wiley (New York, N.Y.) (p. 686), 1963.

Yoe: "Photometric Chemical Analysis," vol. 1, Colorimetry (p. 295), J. Wiley, N.Y., 1928.

MORRIS O. WOLK, *Primary Examiner.*

J. H. TAYMAN, *Assistant Examiner.*